US006471063B2

(12) United States Patent
Stepp

(10) Patent No.: US 6,471,063 B2
(45) Date of Patent: Oct. 29, 2002

(54) EMERGENCY PILL DISPENSER

(76) Inventor: Julia Askew Stepp, 6 Indian Cir., Taylors, SC (US) 29687

( * ) Notice: Subject to any disclaimer, the term of this patent is extended or adjusted under 35 U.S.C. 154(b) by 0 days.

(21) Appl. No.: 09/758,557

(22) Filed: Jan. 11, 2001

(65) Prior Publication Data

US 2002/0088737 A1 Jul. 11, 2002

(51) Int. Cl.[7] .......................... B65D 85/42; H04M 1/00

(52) U.S. Cl. ....................... 206/530; 206/461; 206/532; 206/460; 379/447

(58) Field of Search ......................... 206/528, 530–532, 206/534, 534.1, 538, 539, 461, 460, 813, 223; 190/102, 900; 379/441, 447, 368

(56) References Cited

U.S. PATENT DOCUMENTS

| | | | | |
|---|---|---|---|---|
| 2,317,860 A | | 4/1943 | Sorenson | |
| 2,510,920 A | | 6/1950 | Worthington | |
| 3,933,245 A | | 1/1976 | Mullen | |
| 4,078,660 A | | 3/1978 | Lerro | |
| 4,084,695 A | * | 4/1978 | Halbich | 206/538 |
| 4,372,445 A | * | 2/1983 | Keffeler | 206/538 |
| 4,553,670 A | * | 11/1985 | Collens | 206/534 |
| 4,669,613 A | * | 6/1987 | Collens | 206/534 |
| 5,265,719 A | * | 11/1993 | Wand | 206/223 |
| 5,444,775 A | | 8/1995 | Tobish | |
| 5,954,204 A | | 9/1999 | Grabowski | |

FOREIGN PATENT DOCUMENTS

| | | | | |
|---|---|---|---|---|
| WO | WO 93/17937 | * | 9/1993 | 206/538 |

* cited by examiner

*Primary Examiner*—Bryon P. Gehman
(74) *Attorney, Agent, or Firm*—Robert R. Reed

(57) ABSTRACT

The present invention provides a dispensing unit with a sealed enclosure containing a pill or pills which is provided by a cover attached to a flat base portion. The flat base portion is attached to a commonly used object using a first adhesive. The cover has a top bubble portion to provide space for the pill or pills and a bottom flange which is sealed to the flat base portion using a second adhesive. A tab portion of the cover is used to remove the cover from the base portion to access the pill enclosure. The pill or pills are attached to the top surface of the base portion using a third adhesive. The base portion is not displaced from the object when the cover is removed. The user can easily remove the pill or pills from the base portion by hand as the base portion remains attached to the object. A number of dispensing units can be made together on a larger base assembly with perforations to provide each individual base portion of a dispensing unit.

20 Claims, 8 Drawing Sheets

EMERGENCY PILL DISPENSER

BACKGROUND OF THE INVENTION

This invention is directed to an assembly and unit for providing timely access to medication in the event of an emergency. In particular, the unit is attached to a commonly available object so that a pill can be retrieved from an enclosure of the unit and taken orally when time is critical in avoiding further medical complications.

A number of situations occur when medication taken at the onset of a recognized medical symptom can greatly improve the survival and recovery rate of individuals. It is well known that an aspirin taken at the onset of a heart attack can greatly improve the ability of the victim to survive the heart attack. The sooner the aspirin is taken the better the survival rate. Survival is also dependent on the speed of medical assistance provided to the victim. The sooner an emergency call can be made the sooner this assistance is provided. Therefore, the need for a dispensing unit located at or near a telephone is critical in reducing the times involved with improved survival. The same situation exists with the dispensing of other prescription drugs for heart medicine, such as nitroglycerin tablets.

Other medications used within a short time from the initial symptoms are known to greatly improve survival rate. For example, medication for low or high blood sugar taken by a diabetic. In the case of a diabetic, the patient may actually become unconscious before their medication can be located and taken after making a phone call. Another example is the medication required by a person allergic to insect bites.

Generally speaking, a limited number of pills, such as tablets or capsules, is required at the onset of an emergency. In many cases only a single pill is required prior to assistance from a medical professional. The ability to easily access a pill or pills depends on makeup of the dispensing unit used to house the pill or pills before they are used. Ease-of-access is critical for a quick retrieval of the pill so it can be taken. Easy access is most important to the elderly and the critically ill, particularly if they are living alone. Typical packaging assemblies or containers for providing easy access to individual tablets are disclosed in U.S. Pat. Nos.: 2,317,860; 3,933,245; and 5,954,204. Both patents '204 and '245 illustrate a blister package or tray having a number of individual pockets, each containing a tablet, which can be separated from one another prior to being used. The medical tablets are accessed by either forcing the tablet through backing sheet, which can be ruptured or pealed away from a blister, or displacing the tablet through a lid in a container. These means for accessing individual tablets are sometimes difficult for the elderly and those in distress. Access also depends on where the blister package has been placed when it is needed. The need remains to have an easier method for locating and accessing tablets during an emergency.

A means for providing a medicament for a medical alert is disclosed in U.S. Pat. No. 4,078,660. The alert bracelet includes a bracelet strap beneath the blister package for push-through ejection of the medicament from the bracelet. This patent provides a means for quick easy access to a single medicament if the patient can be made to wear the bracelet. The need remains to provide for more than one tablet and/or different tablets which may be necessary, and to provide for a dispensing unit which is not affixed to the patient.

A most desirable place to locate a pill in the form of a tablet or capsule for an emergency is to attached a dispensing unit containing the tablet or capsule to a telephone set which is most likely to be used in case of an emergency. Typical attachment means are disclosed in U.S. Pat. Nos. 2,510,920 and 5,444,750. The disclosure of '920 illustrates the use of an ordinary vacuum cup made of rubber or other resilient material affixed by pressure to a flat surface of the telephone base. The disclosure of '750 illustrates the use of an adhesive fastener which permits selective attachment of a device to a phone body. Neither one of these patents discuss the need to attach a dispensing unit for tablets or capsules to a telephone unit.

Accordingly, an object of the present invention is to provide means for a person in distress to have immediate access to a pill to improve the chances of a quick recovery in the case of a medical emergency. Especially when time is critical in avoiding further medical complications.

Another object of the present invention is to provide an easily accessed dispensing unit containing a pill which is located on a commonly used and available device or object. Consistent with the object of providing easy access, the dispensing unit can have a simple locking device for improved child safety.

Still another object of the present invention is to provide an assembly or card of dispensing units which is perforated to allows the individual units to be used one at a time.

Yet another object of the invention is to provide a dispensing unit that seals the pill within a pill enclosure prior to being used and allows the user to have easy access to the pill when needed.

A further object of the invention is to provide needed indicia on the dispensing unit to identify the pill and provide instructions to the user.

SUMMARY OF THE INVENTION

The above objectives are accomplished according to the present invention by providing a dispensing unit with a sealed enclosure containing a pill or pills provided by a cover attached to a flat base portion. The flat base portion is attached to a commonly used and available object using a first adhesive. The object must be accessible by a person in need during an medical emergency. The cover has a top bubble portion to provide space for the pill or pills and a bottom flange which is sealed to the flat base portion using a second adhesive. A tab portion of the cover is used to remove the cover from the base portion to access the pill enclosure. To keep the pill or pills easily available, they are attached to the top surface of the base portion using a third adhesive. Therefore, the base portion must not be displaced from the object when the cover is removed. The user can easily remove the pill or pills from the base portion by hand as the base portion remains attached to the object. A number of dispensing units can be made together on a larger base assembly with perforations to provide each individual flat base portion having a single cover.

In one embodiment of the invention a dispensing unit is provided to have at least one pill easily accessible to a person by way of an commonly accessible object in the event of a medical emergency. The dispensing unit comprises a flat base portion attached to an exposed surface of the accessible object at a convenient location to the person. A first adhesive layer is disposed between the base portion and the exposed surface having a first bond strength and area for attaching the base portion to the exposed surface. The dispensing unit includes a cover having a bottom flange and a top bubble portion. A sealed pill enclosure is formed between the top bubble portion and the base portion by the bottom flange being held in contact with the base portion. A second adhesive layer is disposed between the bottom flange of the cover and the base portion. The second adhesive layer has a second bond strength and area for holding and sealing the cover in the contact with the base portion. A third adhesive layer is disposed between the pill and the base portion. The third adhesive has a third bond strength and area for holding the pill attached to the base portion for someone to access the pill when the cover is removed from the base portion. The dispensing unit has the first bond strength multiplied by the first area greater than the second bond strength multiplied by the second area and the third bond strength multiplied by the third area so that the base portion remains attached to the object when the cover is being removed and the pill is being retrieved.

In one aspect of the invention a tab portion integral with the cover extends outward from the bottom flange. The tab portion is gripped and pulled by the person to force the cover from the base portion for accessing the previously sealed enclosure and retrieving the pill by hand. Alternately, the cover may be hinged at the base and/or formed integral with the base. In another aspect of the invention the base portion is part of a larger base assembly having perforations to provide for each base portion when the base assembly is separated at the perforations. In addition, indicia may be placed on the base portion or the cover to clearly indicate the pill name and other medical information needed to properly take the pill, as well as commercial indicia associated with a manufacture placed on either the cover or the base portion.

In another embodiment of the invention a method for providing at least one pill for a person to take during a medical emergency. The method includes the first step of selecting an object that is readily available to the subject or person in the event of the medical emergency. The second step includes providing a dispensing unit having a cover attached to a flat base portion forming a sealed pill enclosure containing the pill attached to the base portion. In a third step, the method includes applying a first adhesive to a bottom surface of the base portion of the dispensing unit. The fourth step includes defining a surface area on the object to receive the dispensing unit in a location easily accessible to the subject. The fifth step includes attaching the dispensing unit to the object at the surface area by pressing the dispensing unit onto the object. In a sixth step, the method includes removing the cover from the base portion by hand to access the pill within the pill enclosure without disposing the base portion from the object. The seventh step includes retrieving the pill from the base portion by hand so that the pill can be consumed on a timely basis.

In another aspect of the invention the step of removing the cover includes unlocking a safety device provided between the cover and the base. The optional safety device may be desirable to limit the ability of children to access the enclosed medication of the dispensing unit.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENTS

Referring now in more detail to the drawings, the invention will now be described in more detail. The invention provides a dispensing unit to give a person immediate access to a pill or pills in the event of a medical emergency. For example, an aspirin has long been recognized as an excellent first aid medical treatment for a person having a heart attack. Immediate access to the aspirin is essential for consuming the aspirin to increase the person's chances for survival. The same immediate access to medication is essential for others, such as seizure patients and diabetics. Therefore, the dispensing unit should be located on an object which would generally be available when the medical emergency occurs. Objects which are readily available include a telephone, a golf bag, wrist bands, briefcases, equipment bags, purses, the dash of a vehicle and the like. The pill or pills should be kept in a sealed pill enclosure which can be quickly accessed. Access must be provided to a person which may be physically impaired at the time the pill or pills are needed. The needs for the dispenser unit are met by the present invention as further discussed.

Figure 1A:
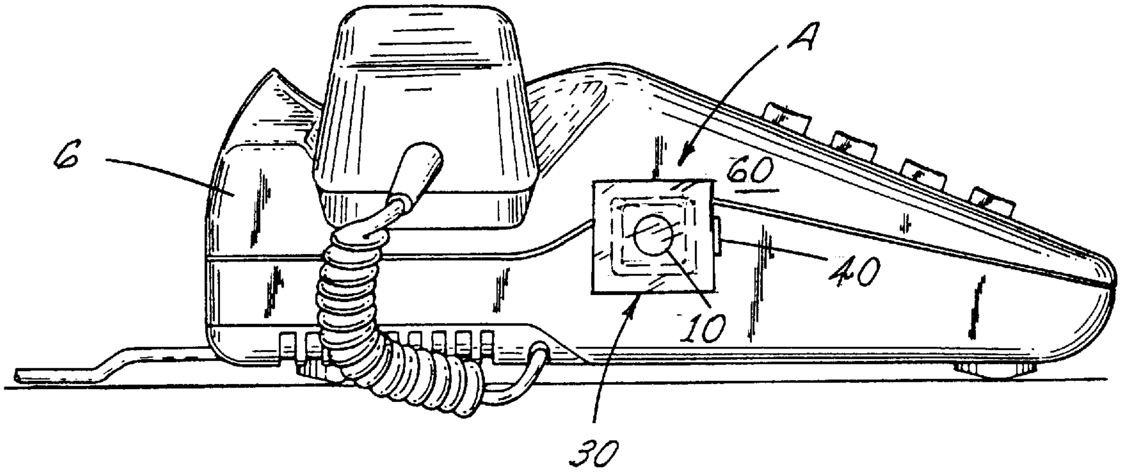
FIG. 1A is a side elevation view of a telephone handset with a pill dispensing unit attached to the side of the handset which can be accessed in the event of an emergency.

A dispensing unit "A" attached to the side of a telephone handset is illustrated in FIG. 1A. The dispensing unit includes a cover 30 to enclose the pill or pills 10 in a sealed enclosure. A convenient surface area 60 of telephone 6 is selected for attachment of the dispensing unit. A tab portion 40 of the cover is included so that a person in need of the pill can easily remove the cover to access the pill. The location of the dispensing unit on a telephone handset is consistent with making the pill or pills available at the same time an emergency call is being made.

Figure 1B:
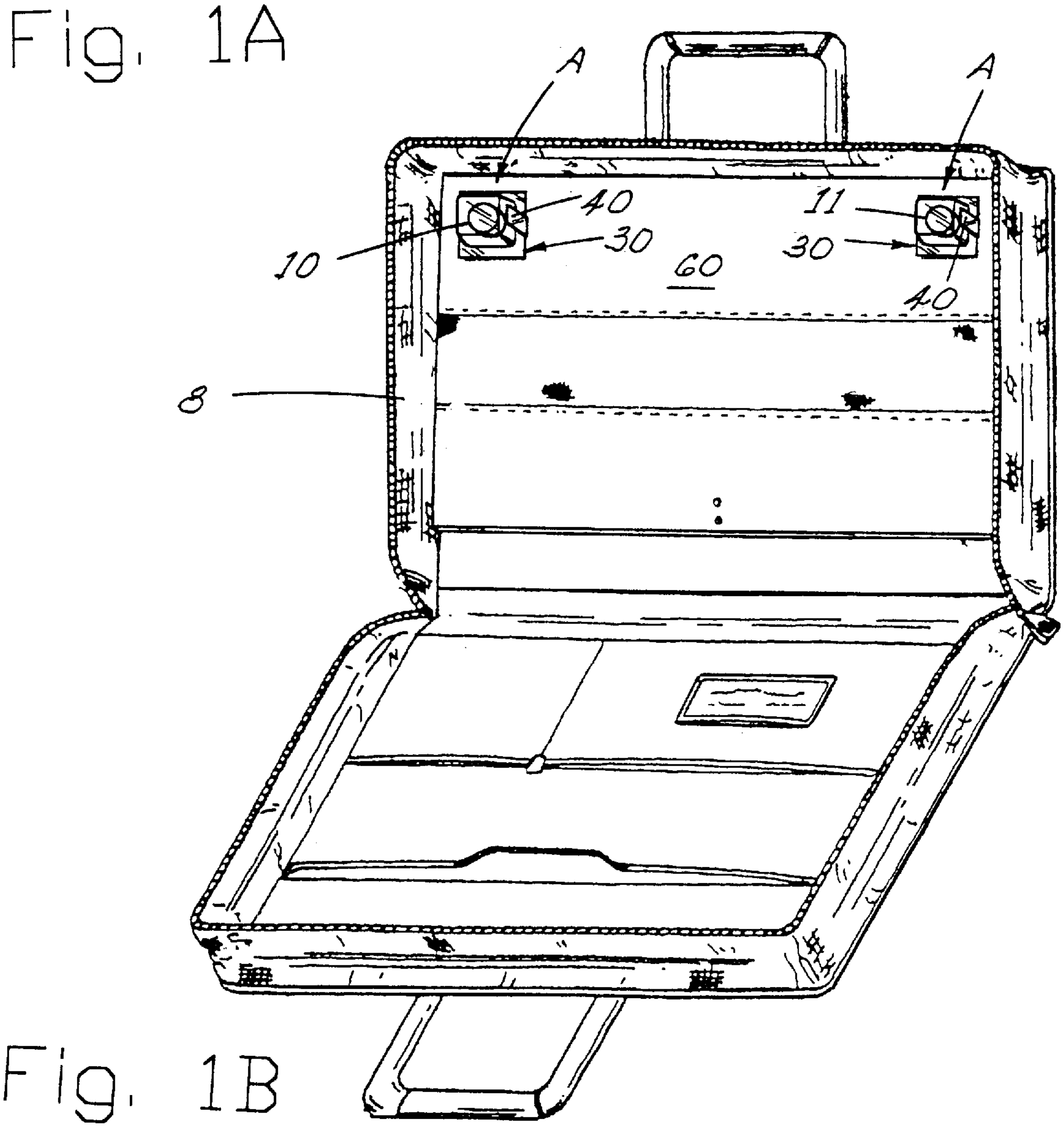
FIG. 1B is a perspective view of an opened brief case showing two pill dispenser units attached to an inside surface of the case for use by a business person in the event of an emergency at work or while traveling.

More than one dispensing unit A can be provided to treat different symptoms of the person in distress, as illustrated in FIG. 1B. For example, a briefcase 8 can have dispensing units on the inside surface area 60. A business person generally has quick access to a briefcase; when working at the office or taking a business trip. Pills 10 and 11 can provide different medications as needed. Tabs 40 again provide easily access to either one or both of the pills.

Figure 2:
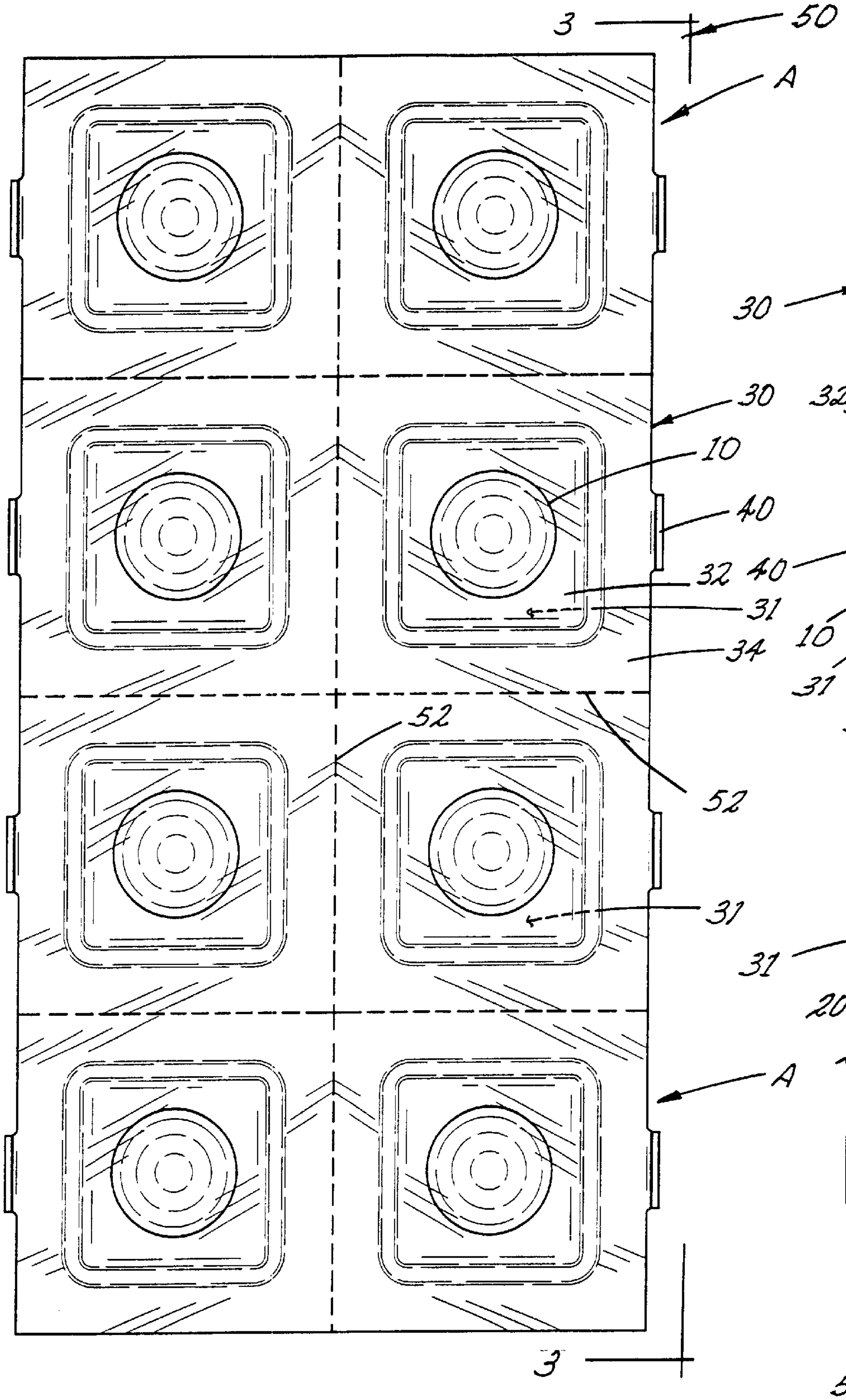
FIG. 2 is a plan view of a base assembly having a plurality of covers attached to the base assembly providing a number of pill dispensing units when separated at the perforations.
Figure 3:
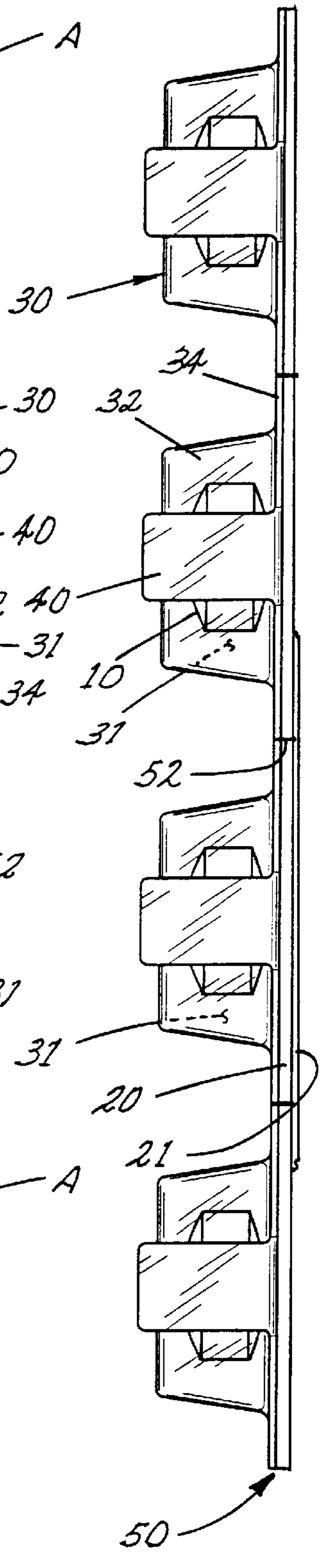
FIG. 3 is a elevation view of the base assembly with attached covers taken along line 3—3 in FIG. 2.

Discussing in more detail the structure of the dispensing units, refer to the illustrations of FIGS. 2 and 3. Dispensing units A are disposed as an assembly of eight dispensing units being two columns having four dispensing units in each column. Other assemblies for providing multiple dispensing units are also within the scope of this invention. Each dispensing unit has a cover 30 including a top bubble portion 32 extending above a bottom flange 34. Each flat base portion 20 of dispensing unit A has a width and length corresponding to the extent of the bottom flange of a respective dispensing unit. A base assembly 50 is large enough to include all flat base portions 20. The base assembly has perforations 52 that allow the base assembly to be divided into the eight individual flat base portions; being one for each dispensing unit A (FIG. 2). Covers 30 are attached to a respective base portion 20 using a second adhesive located between the cover and the base portion. The cover attached to a flat base portion forms a pill enclosure 31 between top bubble portion 32 and flat base portion 20 for containing pills 10. Tab portions 40 extend from each bottom flange 34 to provide a means for easily removing the cover from the base portion. A protective back 21 is placed on the base assembly to protect a bottom side of the base assembly prior to the application of each dispensing unit on the object.

Figure 4:
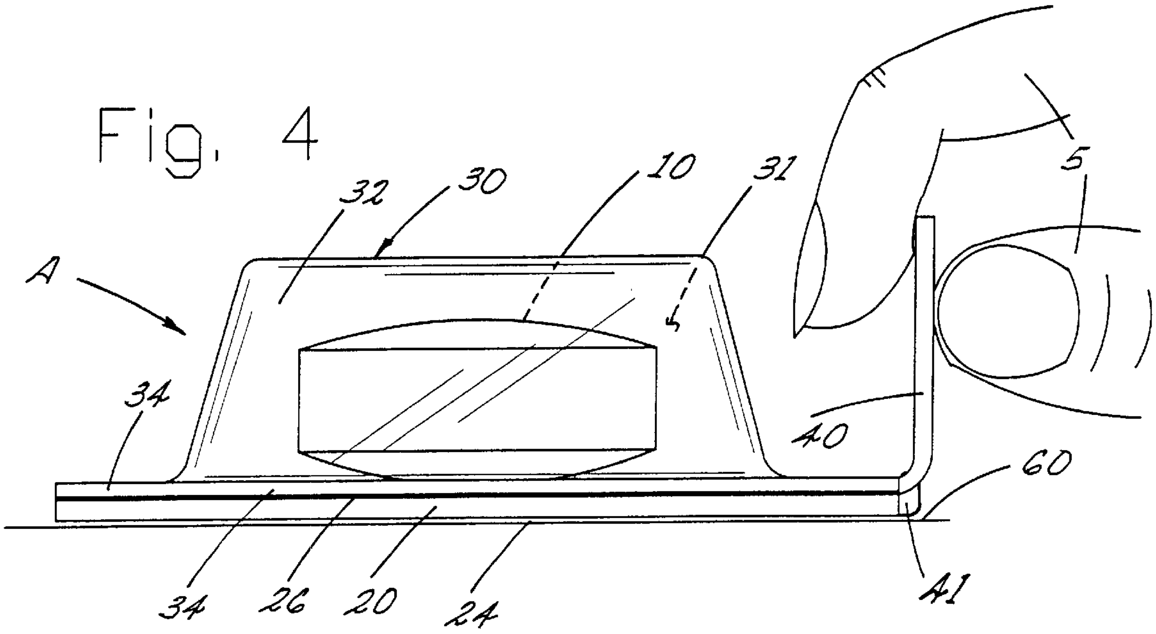
FIG. 4 is a side elevation view of a pill dispensing unit attached to the surface of an object with a person gripping a tab portion to remove the cover from the base portion.
Figure 5:
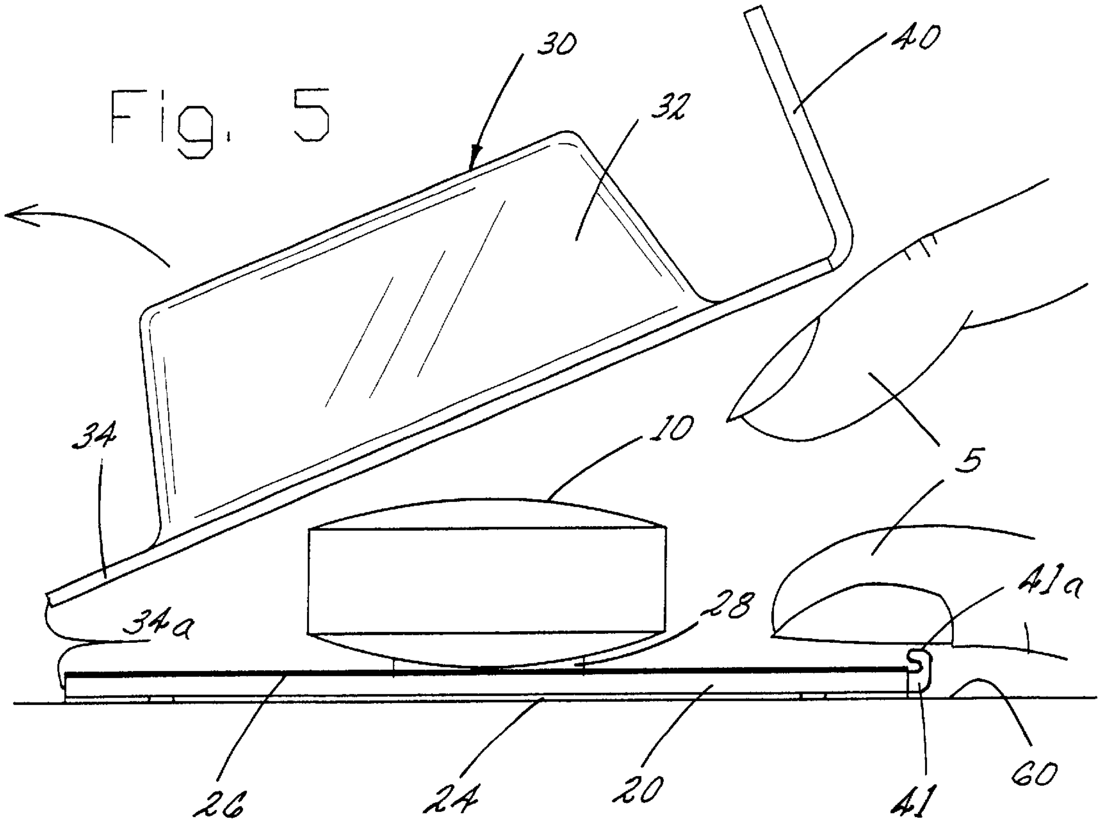
FIG. 5 is a side elevation view of the pill dispenser unit with the cover removed from the base portion while the base portion remains on the surface of the object and the person accesses the pill attached to the base portion.

The ability of a person to easily access a pill or pills within a dispensing unit is critical to the invention. The person must be able to gain access to the pill, such as a tablet or capsule, with a minimum amount of effort. The structural features as well as the location of the dispensing unit of this invention provide a means to achieve these critical features. The illustrations of FIGS. 4 and 5 show the essential components and the pill being accessed by a person. A single dispensing unit A has been attached to a surface 60 of an object, which is easily accessed by a person 5 having a medical emergency. Medical emergency is used herein to indicate any need where the person must take a pill or pills on a timely basis when the normal supply of pills is remote from the location of the person. For example, at home in a medicine cabinet.

Dispensing unit A is attached to surface 60 using a first adhesive layer 24 between a flat base portion 20 of the dispensing unit and the surface. A pill 10 is located within a pill enclosure 31 formed between a cover 30 and the base portion. The cover comprises a top bubble portion 32 and a bottom flange 34. The enclosure should be sealed to protect the pill from contamination. Therefore, a second adhesive layer 26 is placed between the bottom flange 34 and the base portion to provide this seal. To provide a means for easily accessing the enclosure, a tab portion 40 extends outward from bottom flange 34. The person grips the tab portion and pulls cover 30 from its contact with the base portion, as illustrated in FIG. 5. Alternatively, the cover can be formed integral with the base to help provide a hinge between the cover and the base portion so that the cover is not loosely discarded. For example, the hinge may be formed between the common edge 34a between the cover and the base portion by providing a thin continuous portion between them. Preferably there is no hinge, provided the cover can be properly discarded. The pill remains attached to the base portion by the third adhesive layer 28. Otherwise, pill 10 may become displaced and not retrievable.

A simple safety device 41 can be provided between base 20 and cover 30, is or tab portion 40 (see FIGS. 4 and 5). To remove the cover from the base includes unlocking the safety device. For example, a simple safety device can include a hook 41*a* that requires the tab portion to be displaced laterally before pulling the cover away from the base. The safety device may be desirable to limit the ability of children to access the pill. Other similar safety devices known in the industry can be used.

Having gained access to the pill as illustrated in FIG. 5, the person can grasp the pill and the pill can be consumed. The person retrieving the pill is not necessarily the person to consume the pill. The dispensing unit of this invention can be used by a friend or medical assistant to retrieve a pill or pills for someone else in need. The dispensing unit can also be used in a hospital where the nurse is not always immediately available.

Figure 6:
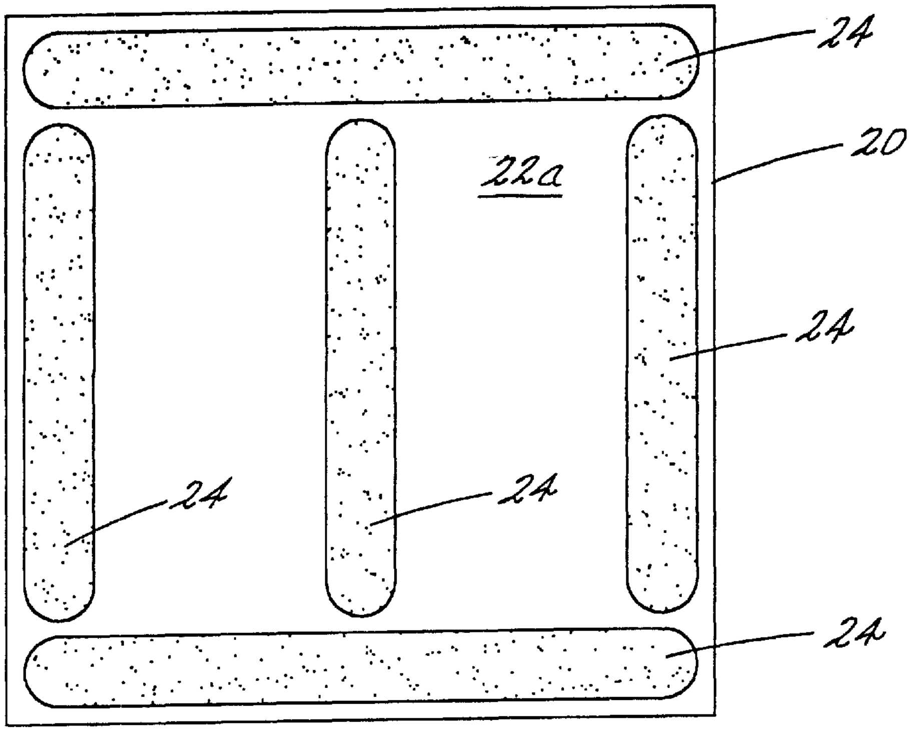
FIG. 6 is a bottom view of the base portion illustrating a first adhesive applied to a bottom surface of the base portion.
Figure 7:
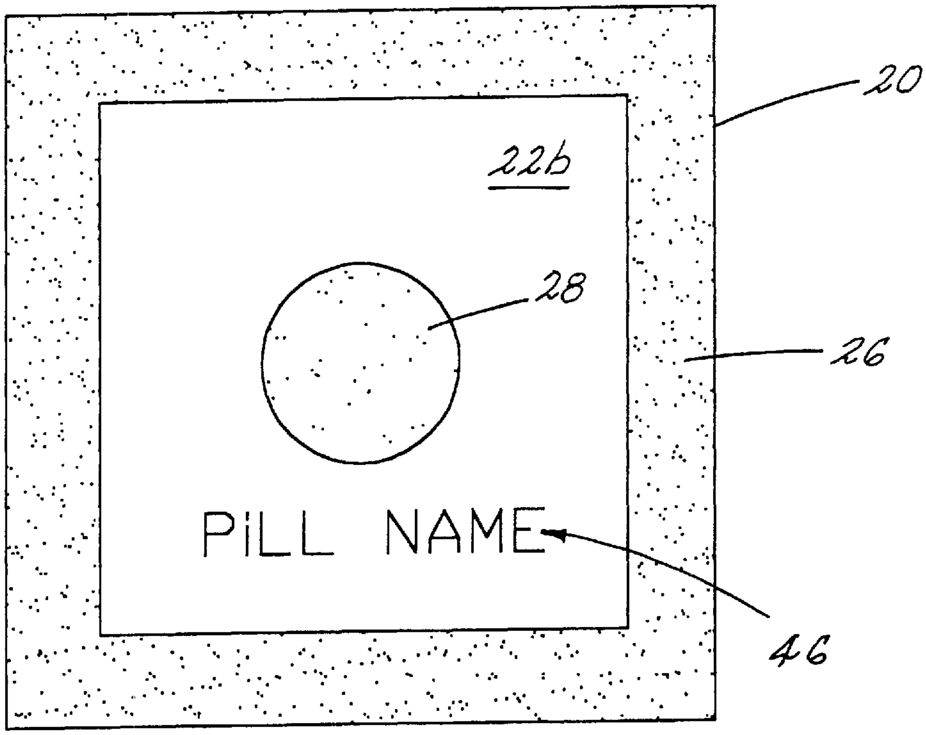
FIG. 7 is a top plan view of the base portion illustrating a second adhesive applied to the outer edges of the base portion to receive the cover, a third adhesive applied to the center of the base portion to receive the pill and a pill name and/or instructions in the use of the pill printed on the top surface of the base portion.

The ability of the base portion to remain attached to the host object is essential to the success of the invention. The type and amount of adhesive used in each of the three locations makes the dispensing unit properly function as an emergency pill dispenser. The location and amount of each adhesive is illustrated in FIGS. 6 and 7. The bottom view of flat base portion 20 of FIG. 6 illustrates a base or first adhesive 24 having been applied. The first adhesive is applied to the bottom surface 22*a* of the base portion to be in contact with the surface of the object when the dispensing unit is attached to the object. The ability to bond the base portion to the object is measured by a bond strength of the adhesive. Bond strength of an adhesive bond between joined substrates is the force required to break the bond divided by the bond area. In other words, the force required to break the bond is the bond strength multiplied by the bond area. The first adhesive of this invention is defined to have a first bond strength and area. The bond area in FIG. 6 is illustrated by the heavily stippled areas. Other patterns in placing the first adhesive are within the scope of this invention, as long as a uniform bonding is achieved.

The top view of flat base portion 20 of FIG. 7 illustrates a cover or second adhesive 26 and a pill or third adhesive 28 applied to the base portion. The second and third adhesives are applied to the top surface 22*b* of the base portion to be in contact with the cover and the pill respectively. The ability to bond the cover to the base portion is measured by a second bond strength and area of the second adhesive. The ability to hold the pill on the base portion is measured by a third bond strength and area of the third adhesive.

The contact between the bottom flange of the cover and base portion 20 is by way of the second adhesive along the lateral edges of the base portion. The second bond area is illustrated as a medium stippled area in FIG. 7. It is important to have a second bond area which will seal the bottom flange to the base portion, as previously discussed. The contact between the pill and the base portion is by way of the third adhesive at or near the middle of the base portion. The third bond area is illustrated as a light stippled area in FIG. 7. The force holding the pill attached to the base portion should only be large enough to keep the pill from being displaced from the base portion before being physically removed by hand.

Figure 8:
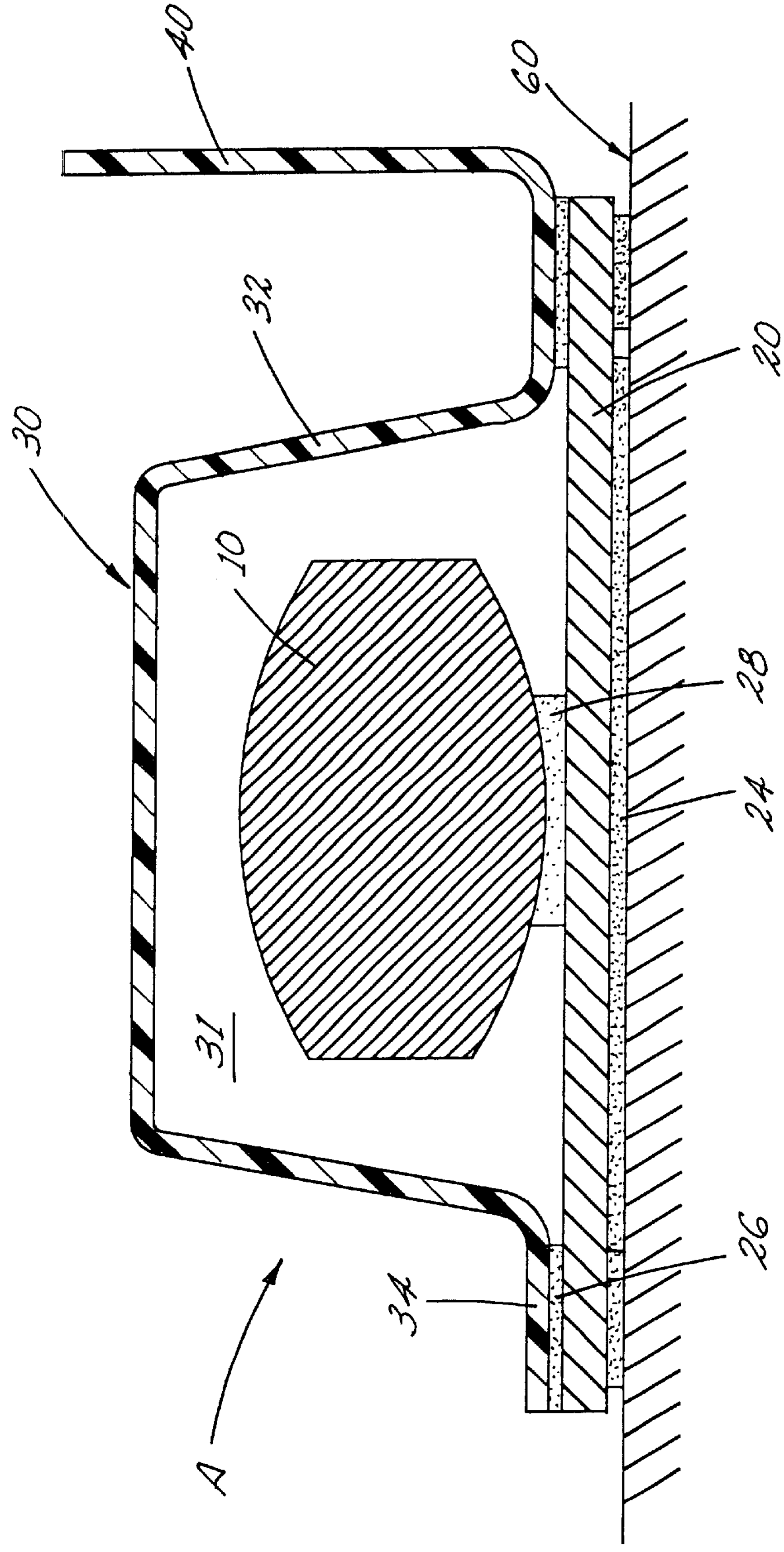
FIG. 8 is a cross-sectional view of the pill dispensing unit, a pill and an associated surface of the object illustrating the location of the first, second and third adhesives.

Detailed information about the structural features of the invention are provided by the cross-sectional view of FIG. 8. Once again, dispensing unit A is shown attached to surface 60 of a selected object that is readily available to a subject or person in the event of a medical emergency. First adhesive layer 24 is located between the surface and flat base portion 20 of the dispensing unit. The cover 30 includes a top bubble portion 32 with bottom flange 34 extending around the top bubble portion. The lateral extent of the flange corresponds with the outer edges of the flat base portion. Second adhesive layer 26 attaches and seals the cover onto the base portion forming a sealed enclosure 31 between the cover and the base portion. Pill 10 is attached to the base portion by third adhesive 28 between the pill and the base portion. Tab portion 40 extends from one side of the flange 34 so that the person can remove the cover from the base portion. The tab portion preferably extends away from the surface so that it is easily accessible by hand.

The relative force to remove cover 30 from base portion 20 is critical to the invention. Generally speaking, the first bond strength multiplied by the first bond area is greater than the second bond strength multiplied by the second bond area. With this relationship satisfied, the force to remove the cover will not displace the base portion from the surface of the object. Therefore, the pill enclosure is easily accessed by one hand of the person (see FIG. 5). Another preferred relationship is satisfied by the first bond strength multiplied by the first bond area is greater than the third bond strength multiplied by the third bond area. From this relationship the pill is easily accessible and removed from the base portion without the base portion being pulled from the surface of the object.

It is desirable to remove the base portion from the surface once the pill has been removed; so another dispensing unit can be added to the object in preparation for another medical emergency. The force to remove the flat base portion from surface 60 should be such that the base portion can be removed by hand (i.e. finger nails). Another dispensing unit may be available from the plurality of dispensing units provided by base assembly 50 (FIG. 2), or from a supply of single dispensing units.

The preferred material for the cover along with the tab portion is a clear plastic; which allows the pill or pills to be viewed through the clear plastic cover. Some pills, such as aspirin and the like, can be easily identified if they are visible. The flat base portion is preferably make of a paper product with a thickness large enough to provide adequate stiffness when attaching the base portion to the surface of the object. Numerous commercially available adhesives exist in the industry to provide the first, second and third adhesive material. A single adhesive material can be used if the various bond areas are adjusted to provide the correct force relationships previously disclosed.

Figure 9:
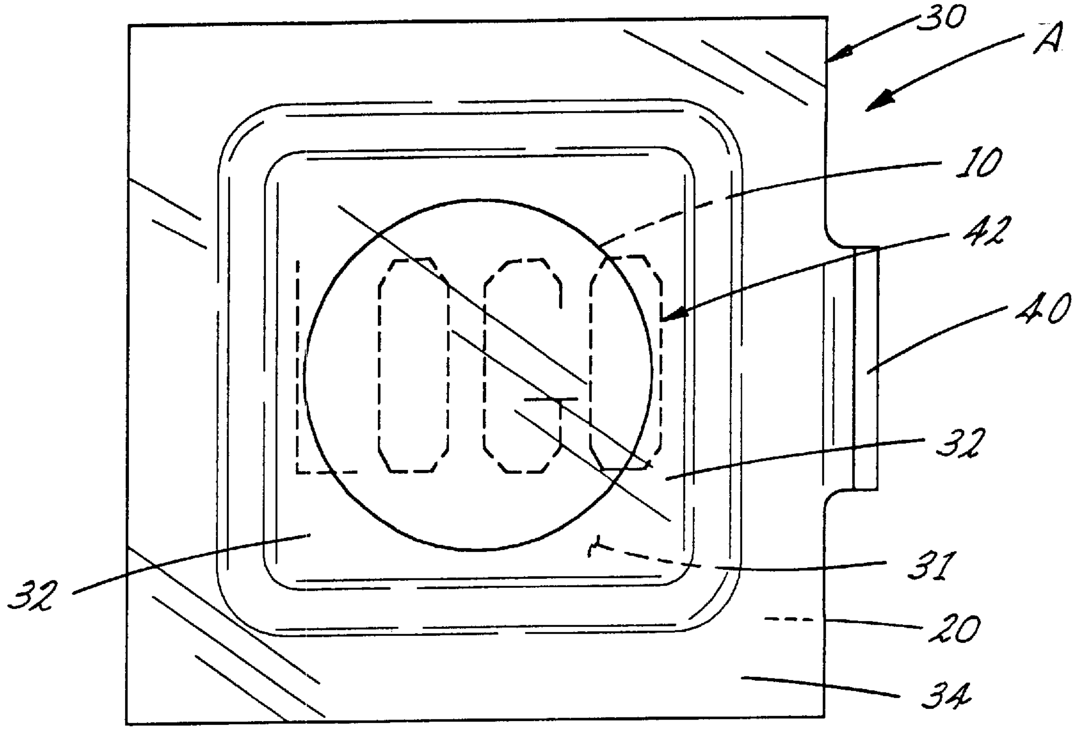
FIG. 9 is a top plan view of a pill dispensing unit and pill illustrating the addition of a trademark and/or commercial name indicia printed on the top bubble portion of the cover.
Figure 10:
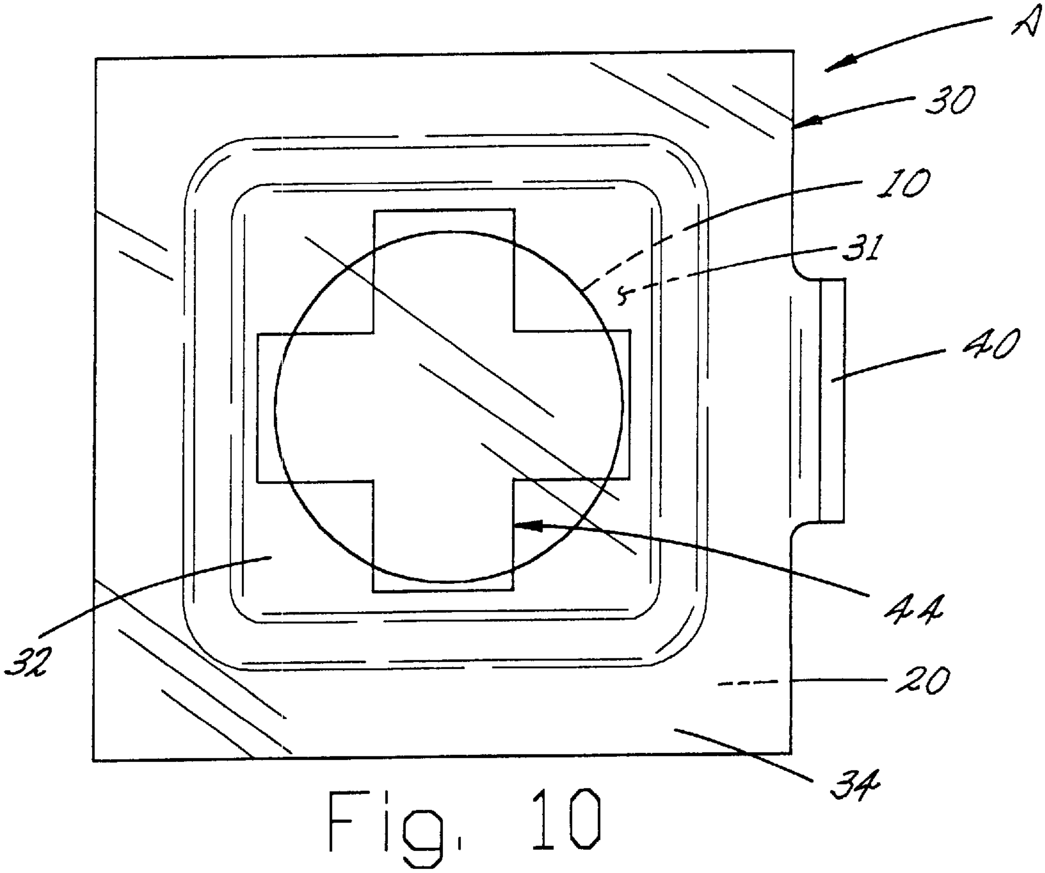
FIG. 10 is a top plan view of the pill dispensing unit and pill illustrating the use of a medical symbol placed on the top bubble portion of the cover.

It may be important to identify the pill or pills and to give instructions as to their use. This aspect of the invention is realized by placing the pill name with instructions somewhere on the dispensing unit. One solution is provided by placing a pill name and/or instructions 46 on the top surface of the flat base portion adjacent the location of the pill, as illustrated in FIG. 7. The cover is also available for location of written indicia. The illustrations of FIGS. 9 and 10 each show a plan view of a single dispensing unit A. A logo 42 is placed on top bubble portion 32 of cover 30 of FIG. 9. The logo may be a trademark or any commercial name for marketing a pill along with the dispensing unit of this invention. A medical symbol 44 placed on cover 30 is illustrated in FIG. 10. The medical symbol is to clearly identify the medical nature of the contents of the dispensing unit. Pill 10 is accessed by pulling tab portion 40. The tab portion can have indicia added to instruct the user on the use of the dispensing unit, such as the word "pull".

Figure 11:
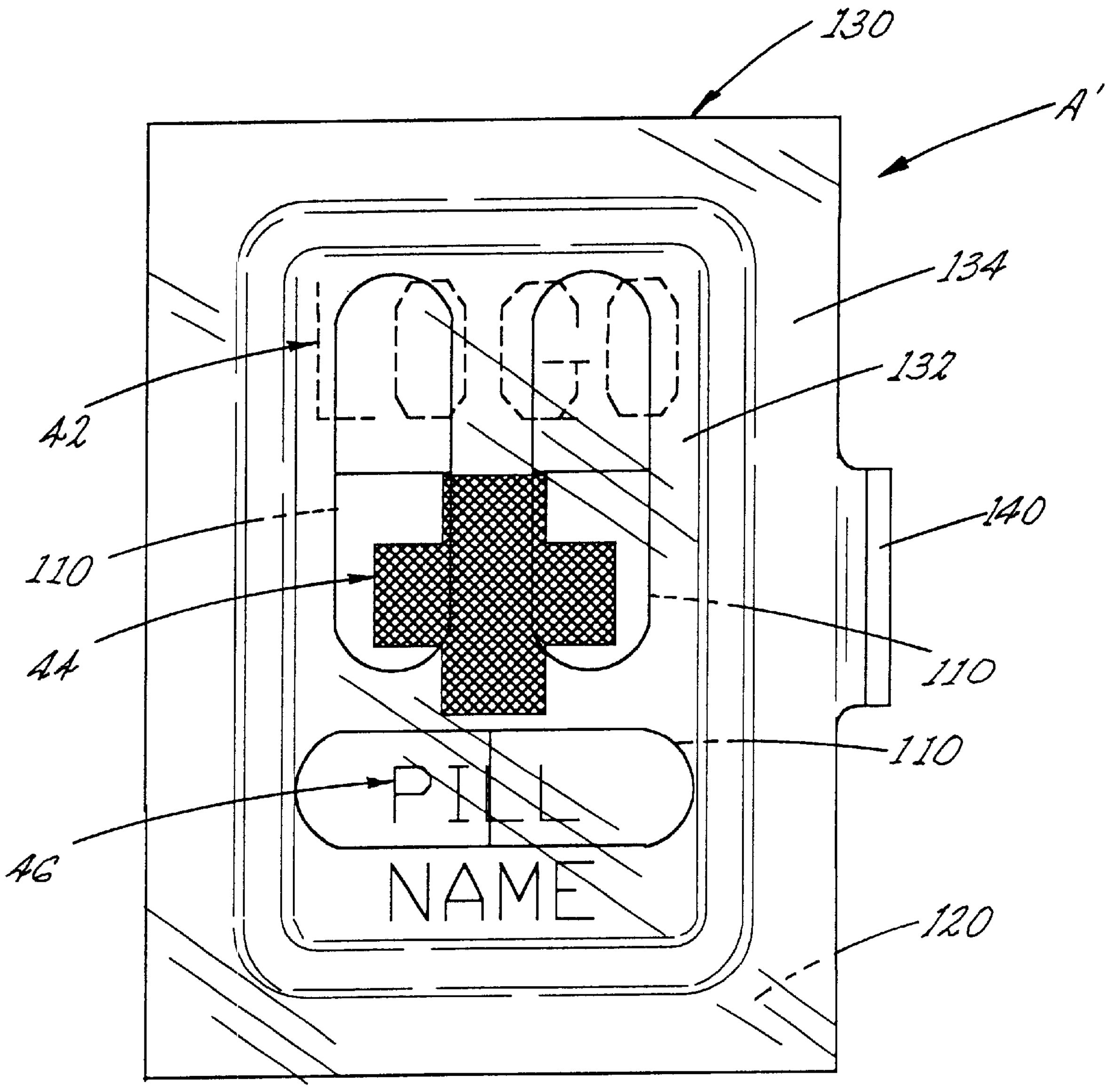
FIG. 11 is a top plan view of an elongated pill dispenser unit with three pills in the sealed pill enclosure and a combination of, medical, commercial and pill name indicia on the cover.

Dispensing units can be made to fit the emergency situation and their medical requirements to insure safe use, proper identification and necessary instructions. A dispensing unit A' is illustrated in FIG. 11 to show three pills 110 in the pill enclosure 131. The pill enclosure is accessed by using a tab portion 140. An elongated cover 130 is provided to include a top bubble portion 132 and a bottom flange 134 attached to a flat base portion 120. The cover has indicia including a logo 42 a medical symbol 44 and a pill name 46. Other indicia can be added as desired to both the base portion and the cover within the scope of this invention.

Figure 12A:
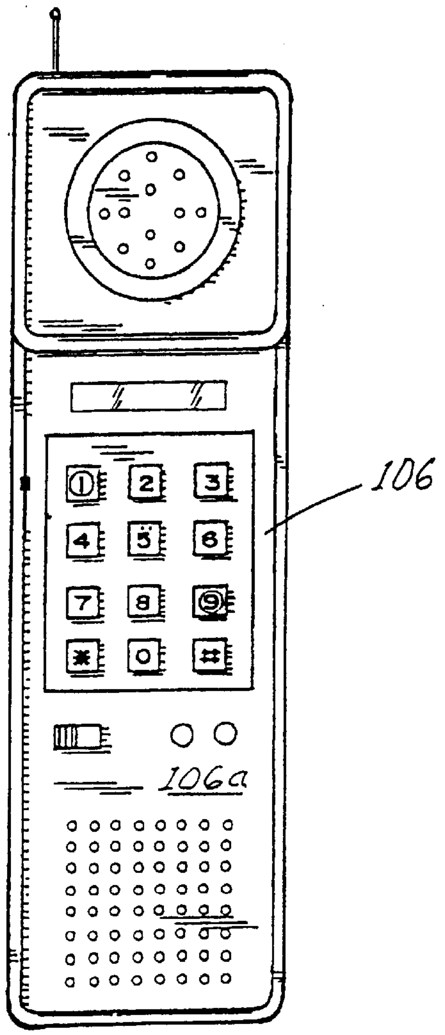
FIGS. 12A and 12B are front and back side elevation views of a telephone wherein a base is formed in the back side to receive the pill in a pill enclosure formed between the base and the cover.
Figure 12B:
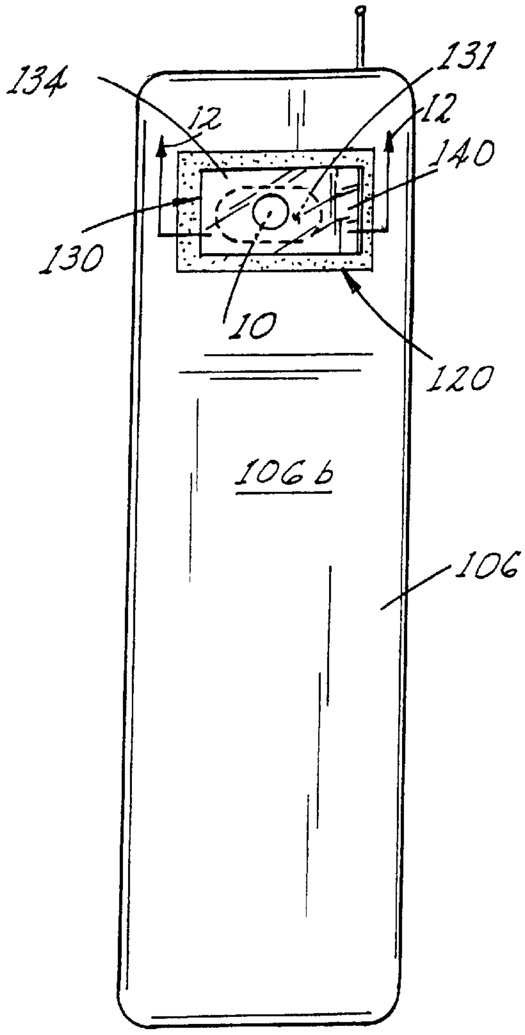
Figure 12C:
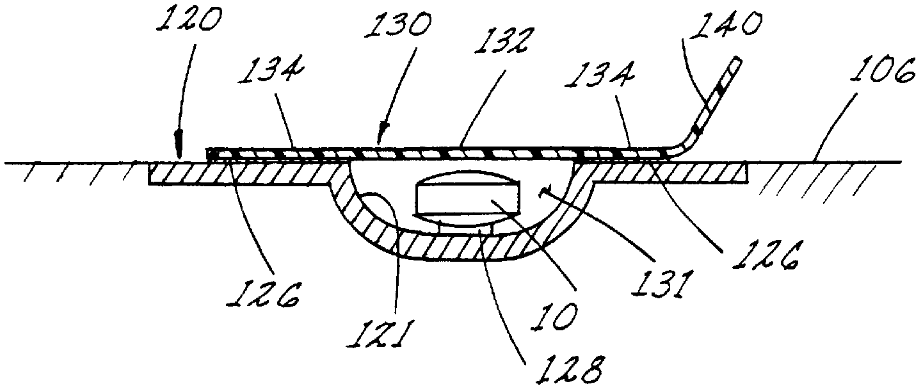
FIG. 12C is a cross-sectional view taken along line 12—12 in FIG. 12B thereof.

In another embodiment of the invention, an object is modified to provide a base for locating the pill. The telephone provides a commonly accessible object used by a person in the event of an emergency. The common first action by a person in distress is to call for assistance. The person may not be thinking clearly and locating a pill or pills should not be necessary. Having the pills easily visible and accessible at the telephone is most desirable. Therefore, the telephone, as an easily accessible object, can be modified to help provide the dispensing unit including a pill enclosure, as illustrated in FIGS. 12A, 12B and 12C. The telephone 106 is shown as a portable phone or cellular phone to provide additional utility of the present invention. Any telephone communication unit can be used. A base portion 120 having a recessed area 121 formed on the back surface 106*b* of the telephone at a convenient location to the person in need (see FIG. 12B).

A cover 130 having a flange 134 and a central portion 132 is placed in a sealed contact with the base portion, as illustrated in FIGS. 12B and 12C. A pill enclosure 131 is formed between the center portion of the cover and the recessed area of the base. A pill 10 is placed within the enclosure to be accessed by removing the cover. A tab portion 140 is affixed to or formed with the cover and extends outward from base portion 120 for the person to easily grasp the tab portion by hand and pull the cover from the base portion.

A cover adhesive layer 126 is disposed between flange 134 of the cover and base portion 120, as illustrated in FIG. 12C. The cover adhesive has a cover bond strength and bond area for holding and sealing the cover in the sealed contact with the base portion. A pill adhesive layer is disposed between the pill and the recessed area of the base portion. The pill adhesive layer hold the pill attached to the base portion for the person to easily access the pill by hand when the cover is removed from the base portion. Alternately, the pill can be attached to the cover with an adhesive layer. However, the pill is preferably attached to the base portion so it will not be lost when removing the cover.

While a preferred embodiment of the invention has been described using specific terms, such description is for illustrative purposes only, and it is to be understood that changes and variations may be made without departing from the spirit or scope of the following claims.

What is claimed is:

1. A dispensing unit for having at least one pill easily accessible to a person by way of an commonly accessible object in the event of a medical emergency, the dispensing unit comprising:

a flat base portion attached to an exposed surface of the accessible object at a convenient location to the person;

a first adhesive layer disposed between said base portion and said exposed surface having a first bond strength and first bond area for attaching said base portion to said exposed surface;

a cover having a bottom flange and a top bubble portion, wherein a sealed pill enclosure is formed between said top bubble portion and said base portion by said bottom flange being in a sealed contact with said base portion;

a second adhesive layer disposed between said bottom flange of said cover and said base portion, wherein said second adhesive layer has a second bond strength and second bond area for holding and sealing said cover in said sealed contact with said base portion;

a third adhesive layer disposed between the at least one pill and said base portion, said third adhesive having a third bond strength and third bond area for holding the at least one pill attached to said base portion for the person to access the at least one pill when said cover is removed from said base portion; and said first bond strength multiplied by said first bond area as greater than said second bond strength multiplied by said second bond area and said third bond strength multiplied by said third bond area so that the base portion remains attached to the object when the cover is being removed and the at least one pill retrieved.

2. The dispenser unit of claim 1 including a tab portion integral with the cover to extend outward from the bottom flange so that said tab portion is gripped and pulled by the person to force said cover from said base portion for accessing the previously sealed pill enclosure and retrieving the at least one pill by hand.

3. The dispensing unit of claim 1 wherein said first and second bond areas are approximately equal and said first bond strength is greater than said second bond strength.

4. The dispensing unit of claim 1 wherein said first, second and third bond strengths are approximately equal and said first bond area is greater than said is second bond area and said third bond area.

5. The dispensing unit of claim 1 wherein said flat base portion is part of a larger base assembly having perforations to provide said flat base portion when said base assembly is separated at said perforations.

6. The dispensing unit of claim 5 including a protective back placed on the bottom side of the larger base assembly to protect the first adhesive from sticking to other objects prior to placing said fiat base portion on the accessible object.

7. The dispensing unit of claim 1 including indicia placed on said base portion to clearly indicate the pill name and other medical information needed to properly consume the at least one pill.

8. The dispensing unit of claim 7 including medical and commercial indicia placed on said cover to clearly show the required medical information on the at least one pill and decrease the occurrence of improper use thereof.

9. The dispensing unit of claim 1 including a hinge formed a common edge between said cover and said base portion, wherein said cover is formed integral with with said base portion along said common edge with a manufacture placed on one of either said cover or said base portion.

10. An aspirin dispenser assembly located at a commonly used object for use by a person during a medical emergency, said assembly comprising:

a plurality of aspirin covers each formed by a top bubble portion extending from a bottom flange;

a base assembly with flat base portions provided by perforations of the base assembly corresponding to the extent of each bottom flange of a respective aspirin cover;

a plurality of aspirin enclosures provided by sealing each bottom flange of said aspirin covers to a respective flat base portion using a cover adhesive;

a base adhesive located on a bottom surface of said flat base portion for holding the flat base portion attached to the object, said base adhesive having a first bond strength and first bond area to maintain the base portion attached to the object when the cover is removed from the base portion by hand to access a respective aspirin enclosure; and a pill adhesive located on a top surface of said base portion to retain the aspirin attached to said base portion within said respective aspirin enclosure, wherein the aspirin is easily removed by hand after the cover is removed from the base portion.

11. The assembly of claim 10 wherein said cover adhesive has a second bond strength and second bond area, wherein said first bond strength multiplied by said first bond area is greater than said second bond strength multiplied by said second bond area.

12. The assembly of claim 10 wherein said pill adhesive has a third bond strength and third bond area, wherein said first bond strength multiplied by said first bond area is greater than said third bond strength multiplied by said third bond area.

13. The assembly of claim 10 wherein a plurality of tab portions, each formed integral with a respective bottom flange of said aspirin covers, extending outward from said base portion so that the person can easily remove said aspirin covers from said base portions.

14. The assembly of claim 10 including printed medical indicia placed on said cover to clearly show the required medical information of the at least one pill to decrease the occurrence of improper use thereof.

15. A method for providing at least one pill for a subject to take during a medical emergency, said method including the steps of:

a) selecting an object that is readily available to the subject in the event of the medical emergency;

b) providing a dispensing unit having a cover attached to a flat base portion using a second adhesive for forming a sealed pill enclosure containing the at least one pill inside said dispensing unit and attached to the base portion using a third adhesive;

c) applying a first adhesive to a bottom surface of said base portion of said dispensing unit;

d) defining a surface area on said object to receive said dispensing unit in a location easily accessible to the subject without regard to an orientation of the surface area;

e) attaching said dispensing unit to said object at said surface area by pressing said dispensing unit onto said object;

f) removing said cover from said base portion by hand to access the at least one pill being supported by said base within said pill enclosure without disposing said base portion from said object; and g) retrieving the at least one pill from the base portion by hand, wherein the at least one pill can be consumed on a timely basis.

16. The method of claim 15 wherein the step of removing said cover from said base portion includes:

providing a tab portion extending from said cover; and gripping said tab portion by hand and pulling said cover apart from said base portion.

17. The method of claim 15 including the steps of:

providing a thin protective sheet on a bottom side of said base portion; and protecting said first adhesive from being displaced or damaged prior to the step of attaching said dispensing unit to said object.

18. The method of claim 15 including the further steps of:

removing the base portion from the object by hand;

providing another dispensing unit to be used of a subsequent emergency; and repeating the same steps e) through g) in the event of another emergency.

19. The method of claim 16 wherein the step of removing said cover from said base portion includes initially unlocking a safety device located between said cover and said base.

20. A dispensing unit for having at least one pill easily accessible to a person by way of an accessible object, the dispensing unit comprising:

an exposed surface area of a telephone commonly accessible by the person having a medical emergency;

a recessed base portion with a recessed area formed in said exposed surface area of said telephone;

a cover having a flange and a central portion , wherein a sealed pill enclosure is formed between said central portion and said recessed base portion by said flange of said cover being in a sealed contact with said base portion;

a cover adhesive layer disposed between said flange of said cover and said base portion, wherein said cover adhesive layer has a cover bond strength and cover bond area for holding and sealing said cover in said sealed contact with said base portion;

a pill adhesive layer disposed between the at least one pill and said base portion, said pill adhesive having a pill bond strength and pill bond area for holding the at least one pill attached to said recessed area of said base portion for the person to access the at least one pill when said cover is removed from said base portion;

a tab portion formed integral with the cover to extend outward from said flange so that said tab portion is gripped and pulled by the person to force the cover from said base portion to access the previously sealed pill enclosure and retrieve the at least one pill by hand; and said cover bond strength multiplied by said cover bond area is less than a pulling force on the tab portion provided by the person accessing the sealed pill enclosure and the pill bond strength multiplied by the pill bond area is less than said cover bond strength multiplied by said cover bond area.

* * * * *